United States Patent [19]

Dean

[11] Patent Number: 5,342,026
[45] Date of Patent: Aug. 30, 1994

[54] VALVE INCLUDING RESILIENT MOUNT FOR PIN

[75] Inventor: Robert H. Dean, Evanston, Ill.

[73] Assignee: Midland Manufacturing Corp., Skokie, Ill.

[21] Appl. No.: 77,275

[22] Filed: Jun. 17, 1993

[51] Int. Cl.⁵ .................... F16K 25/00; F16K 31/524
[52] U.S. Cl. .......................... 251/85; 251/144; 251/263
[58] Field of Search ............ 251/85, 86, 251, 263, 251/144; 403/345, 361, 378

[56] References Cited

U.S. PATENT DOCUMENTS

| | | | |
|---|---|---|---|
| 1,284,063 | 11/1918 | Davis, Jr. et al. | 251/144 |
| 1,609,879 | 12/1926 | Messmer | 251/263 |
| 1,779,750 | 10/1930 | Oldham | 251/86 |
| 2,384,787 | 9/1945 | Baker et al. | 251/80 |
| 2,470,700 | 5/1949 | Henry | 251/85 |
| 2,848,187 | 8/1958 | Henry | 251/85 |
| 3,065,950 | 11/1962 | Goldberg | 251/85 |
| 3,963,211 | 6/1976 | Myers | 251/85 |
| 4,073,469 | 2/1978 | Kodric | 251/86 |
| 4,248,403 | 2/1981 | Scull | 251/85 |
| 4,280,679 | 7/1981 | Shaw | 251/144 |
| 4,408,627 | 10/1983 | Harris | 137/242 |
| 4,586,538 | 5/1986 | Niskanen | 251/85 |
| 5,170,988 | 12/1992 | Chronister | 251/251 |

OTHER PUBLICATIONS

Midland Manufacturing Corporation brochure for Bottom Outlet Valves (1987).

*Primary Examiner*—George L. Walton
*Attorney, Agent, or Firm*—Emrich & Dithmar

[57] ABSTRACT

A valve has a valve member and an actuating member supported on the valve member by a mounting pin for actuating movement, wherein the pin has an axis extending between opposite ends thereof and the actuating member is connected to the pin intermediate its ends. The pin is supported on the valve member by a resilient coupling assembly including a support ring engaging the opposite ends of the pin and floating on a wave spring seated on a second support ring which is screwed to the valve member so that forces applied to the pin perpendicular to its axis will translate the pin against the spring rather than bend the pin. The second support ring is welded to a retaining ring and cooperates therewith to retain the spring and the first support ring in an integral cartridge module which can be mounted as a unit on the valve member.

20 Claims, 2 Drawing Sheets

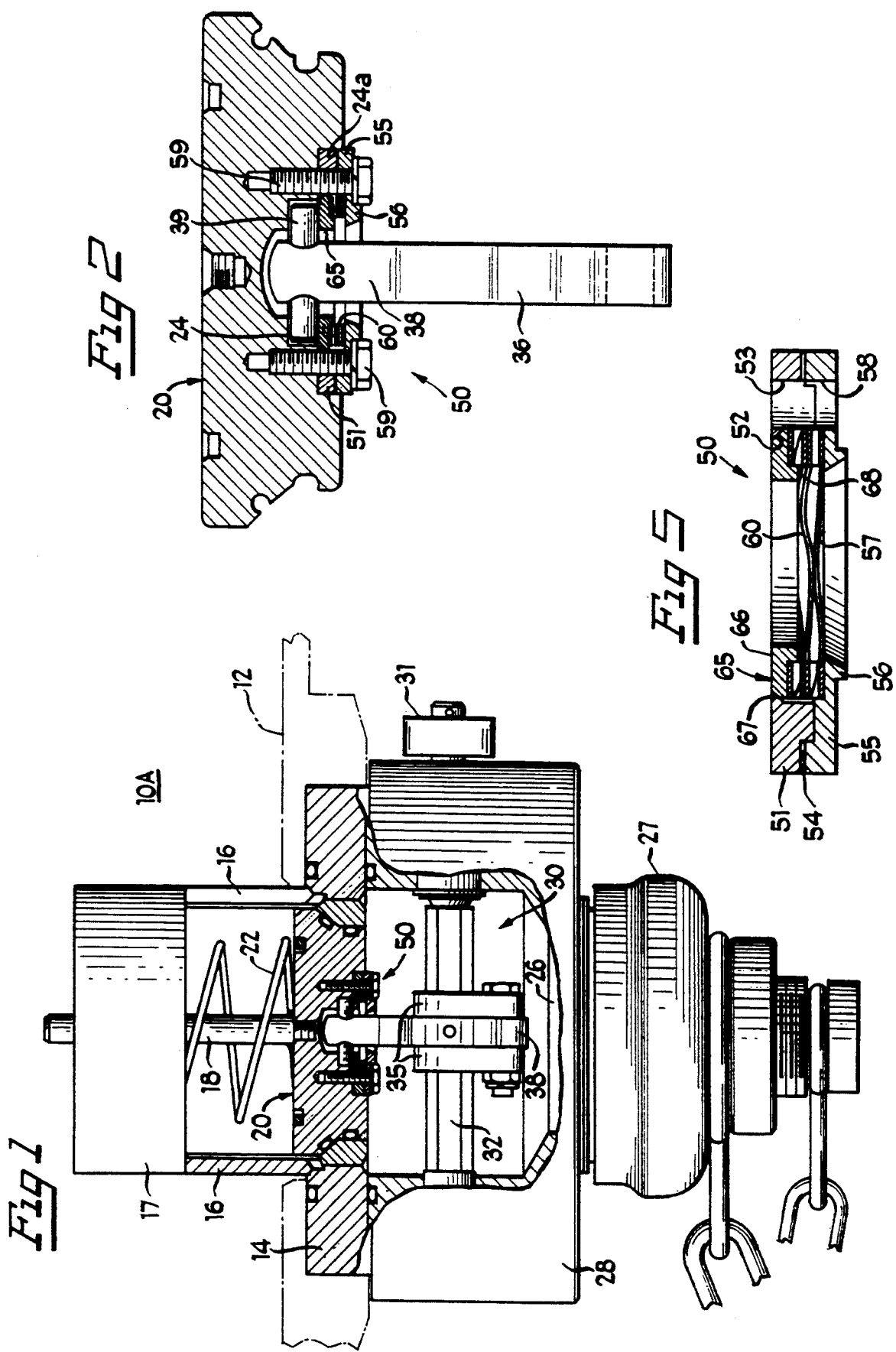

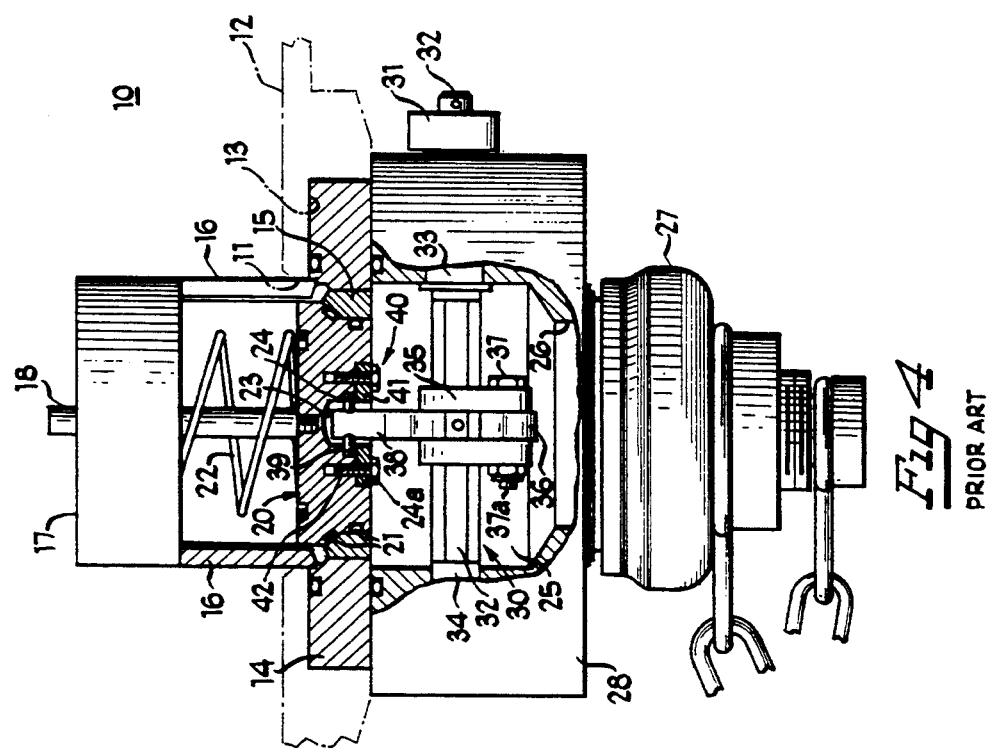
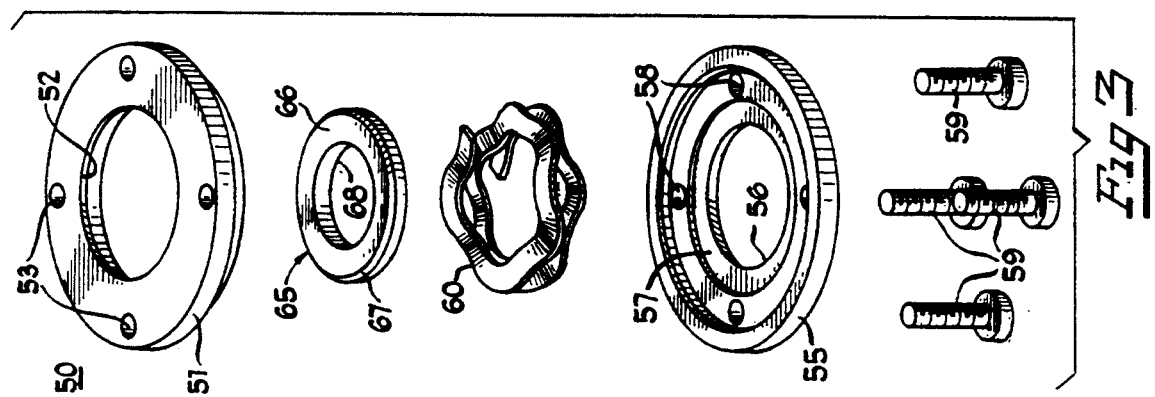
Fig 3
Fig 4
PRIOR ART 5,342,026

VALVE INCLUDING RESILIENT MOUNT FOR PIN

BACKGROUND OF THE INVENTION

1. Field of the Invention

The present invention relates to valves and, in particular, to valves of a type wherein a movable valve member is coupled to an actuating linkage by means of a cross pin retained in a socket in the valve member to accommodate pivotal movements of the linkage relative to the valve member during opening and closing of the valve.

2. Description of the Prior Art

A common type of valve is a bottom outlet valve of the type manufactured by Midland Manufacturing Corporation. Such valves include a housing defining an annular valve seat against which a poppet valve member is reciprocatively movable by means of an actuating linkage. The linkage includes a cam lever which has an upper end thereof received in a socket in the bottom of the valve member and having a bore diametrically therethrough receiving a cross pin, the ends of the pin being accommodated in a counterbore of the socket. The pin is retained in place by a retaining plate which is fixed to the valve member and engages the end portions of the pin to clamp it in the counterbore. The pin accommodates slight pivotal movements of the cam arm relative to the valve member during opening and closing of the valve. During such valve operation, significant forces are exerted on the pin in directions generally perpendicular to its axis. When the load on the valve member is sufficiently high, these forces may be sufficient to bend the pin, thereby interfering with free pivotal movement of the cam lever and impairing operation of the valve.

SUMMARY OF THE INVENTION

It is a general object of the invention to provide an improved valve construction which avoids the disadvantages of prior valves while affording additional structural and operating advantages.

An important feature of the invention is the provision of a valve of the type which incorporates an actuating linkage coupling pin and which effectively inhibits bending or other deformation of the pin.

In connection with the foregoing feature, another feature of the invention is the provision of a valve of the type set forth which accommodates limited translational movement of the pin.

Yet another feature of the invention is the provision of a valve of the type set forth, which provides a resilient support for the pin which is of simple and economical construction.

These and other features of the invention are attained by providing in a valve having a valve member movable between open and closed conditions and an actuating member coupled to the valve member by a coupling pin for operating the valve member, wherein the pin has an axis extending between opposite ends thereof and the actuating member is connected to the pin intermediate its ends, so that operation of the valve member applies forces to the pin in a direction perpendicular to the axis, the improvement comprising: resilient cushioning means carried by the valve member and engageable with the pin adjacent to its opposite ends for supporting the pin, the cushioning means being yieldable to accommodate translational movement of the pin in response to the forces exerted thereon by the actuating member.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a valve in accordance with the present invention, shown mounted in an associated vessel fragmentarily illustrated in phantom, and with portions broken away and in section more clearly to illustrate the internal construction;

FIG. 2 is an enlarged sectional view of the valve member of the valve of FIG. 1 and the associated actuating mechanism therefor;

FIG. 3 is an enlarged, exploded, perspective view of the coupling assembly of the valve of FIGS. 1 and 2;

FIG. 4 is a view similar to FIG. 1 on a slightly reduced scale, and illustrating a prior valve construction; and FIG. 5 is an enlarged, sectional view of the coupling assembly cartridge.

DESCRIPTION OF THE PREFERRED EMBODIMENT

Referring to FIG. 4, there is illustrated a prior art valve 10 which is mounted in an opening 11 in the bottom wall 12 of an associated vessel. The bottom wall 12 has an annular recess 13 therein surrounding the opening 11 and in which is seated an annular body 14 of the valve 10. Fixed to the radially inner surface of the body 14 is an annular valve seat 15. The valve body 14 includes a plurality of upstanding legs 16 equiangularly spaced apart around the body 14 and projecting upwardly into the associated vessel and interconnected adjacent to their upper ends by a cylindrical ring 17. The ring 17 is provided at its upper end with a spoked guide frame (not shown) which receives the upper end of an elongated guide stem 18 which extends coaxially through the ring 17. The lower end of the guide stem 18 is attached to a circular poppet valve member 20 provided around its circumference with 0-ring seals 21 for sealing engagement with the valve seat 15. A helical compression spring 22 resiliently urges the valve member 20 toward its closed condition, illustrated in the drawing, in sealing engagement with the valve seat 15. It will be appreciated that the valve member 20 is movable vertically upwardly against the urging of the spring 22 to an open condition (not shown), permitting the flow of lading between the body legs 16 and through the valve.

Formed in the underside of the valve member 20 is an axial socket 23 provided with a cylindrical counterbore 24 and a larger-diameter cylindrical counterbore 24(a). The valve 10 includes a cylindrical base 25 which is fixedly secured by suitable fasteners (not shown) to the body 14 and projects downwardly beneath the bottom wall 12, terminating in a cylindrical nozzle 26 which is closed by a cap 27 which may be threaded on the nozzle 26. The base 25 may be surrounded with a body of a suitable insulating material retained in place by an annular insulation jacket 28.

The valve member 20 is moved between its opened and closed conditions by an actuating mechanism 30 which includes a handle 31, coupled to one end of a shaft 32 which extends through a radial openings in the insulation jacket 28 and the base 25, the latter being provided with a bushing 33. The inner end of the shaft 32 is seated in a bushing 34 in a radial bore in the opposite side of the base 25. The shaft 32 is fixed intermediate its ends to a cam 35 which includes a pair of spaced-apart members which project radially from the shaft 32 and receive between their distal ends the adjacent end of an elongated cam lever 36, being pivotally coupled thereto by a bolt 37 and a nut 37a. The cam lever 36 has a head end 38 which is received in the socket 23 in the valve member 20 and has a diametrical bore therethrough receiving a coupling pin 39 which is accommodated in the counterbore 24 and has a length very slightly less than the diameter of the counterbore 24.

The pin 39 is coupled to the valve member 20 by a coupling assembly 40, which includes an annular support retainer 41 which is seated in the counterbore 24a and receives axially therethrough the head end 38 of the cam lever 36. The support retainer 41 is fixedly secured to the valve member 20 by screws 42. The support retainer 41 has an inner diameter such that it engages the coupling pin 39 adjacent to the opposite ends thereof, and cooperates with the counterbore 24 to securely retain the coupling pin 39 in place.

In operation, it will be appreciated that when the shaft 32 is rotated by the handle 31, the valve member 20 is moved vertically between its open and closed conditions. Considerable force may sometimes need to be applied in order to move the valve member 20 to its closed condition. For example, if the base 25 is filled with liquid lading it may not be possible to fully close the valve against an incompressible fluid resulting in excessive force being applied to the actuating mechanism 30. Thus, the cam lever 36 may exert considerable force on the coupling pin 39 and in directions perpendicular to the pin's axis. This force may be sufficient to bend or deform the coupling pin 39, which may seriously impair the operation of the valve 10.

Referring now to FIGS. 1-3, there is illustrated a valve 10A in accordance with the present invention. The valve 10A is substantially identical to the valve 10, except that the coupling assembly 40 has been replaced with a coupling assembly 50. Thus, like parts of the valves 10 and 10A have been given the same reference numbers. The coupling assembly 50 includes an annular retainer 51 which is seated in the counterbore 24a in the valve member 20, and is provided at its upper end with a radially inwardly extending short annular lip 52 which has a frustoconical inner surface with an inner diameter substantially equal to the diameter of the counterbore 24 and very slightly greater than the length of the coupling pin 39. The retainer 51 has a plurality of equiangularly spaced-apart holes 53 therethrough.

The coupling assembly 50 also includes an annular fixed support ring 55 which is disposed against the underside of the retainer 51 and has a depending cylindrical flange 56 having an inner diameter substantially less than that of the retainer lip 52. The upper surface of the support ring 55 has an annular recess 57 at the radially innermost portion thereof. The support ring 55 is provided with a plurality of equiangularly spaced-apart holes 58 which are aligned with the holes 53 in the retainer 51 for receiving associated screws 59 which are, in turn, received in threaded bores in the valve member 20 to fixedly secure the coupling assembly 50 thereto.

The coupling assembly 50 also includes an annular wave spring 60 which is seated in the annular recess 57 of the support ring 55. Overlying the wave spring 60 is an annular movable support ring 65 having an upper support surface 66 which is disposed for engagement with the coupling pin 39, and which has a chamfer 67 at its outer circumferential edge disposed for mating engagement beneath the lip 52 of the retainer 51. The support ring 65 has a short depending cylindrical portion 68 dimensioned to nest coaxially in the wave spring 60 for positioning the parts.

It will be appreciated that the wave spring 60 resiliently urges the movable support ring 65 and the fixed support ring 55 axially apart, while the movable support ring 65 supports the coupling pin 39, thereby to cushion the coupling pin 39. The upward movement of the support ring 65 is limited by engagement of the chamfer 67 with the retainer lip 52. It will be appreciated that when downward forces are exerted on the coupling pin 39 by the cam lever 36, the wave spring 60 can yield, accommodating a downward movement of the support ring 65 and a corresponding downward translational movement of the coupling pin 39. This movement of the coupling pin 39 effectively inhibits bending or other deformation thereof.

Referring also to FIG. 5, a significant aspect of the invention is that the coupling assembly 50 is arranged as a cartridge module for ease of handling and mounting. More specifically, the support ring 55 and the retainer 51 are stacked in axial alignment, sandwiching the wave spring 60 and the support ring 65 therebetween, and then compressed with the holes 58 aligned, the support ring 55 then being welded to the retainer 51 and their mating faces, as at weldments 54. The resulting integral mating cartridge module can be easily handled and assembled to the valve member 20 as a unit. No loose parts need be handled or assembled when interchanging the coupling assembly 50 for the coupling assembly 40.

From the foregoing, it can be seen that there has been provided an improved valve construction which effectively inhibits bending or other deformation of the valve member coupling pin.

I claim:

1. In a valve having a valve member movable between open and closed conditions and an actuating member having an end directly coupled to the valve member by a coupling pin for operating the valve member, wherein the pin has an axis extending between opposite ends thereof and the actuating member is connected to the pin intermediate its ends, so that operation of the valve member applies forces to the pin in a direction perpendicular to the axis, the improvement comprising: resilient cushioning means mounted on the valve member and engageable with the pin adjacent to its opposite ends for supporting the pin, said cushioning means being yieldable to accommodate translational movement of the pin in response to the forces exerted thereon by the actuating member.

2. The valve of claim 1, wherein the pin extends through a bore in the actuating member.

3. The valve of claim 2, wherein said cushioning means engages the pin along substantially the entire length thereof except for the portion disposed in the bore.

4. The valve of claim 1, wherein said cushioning means includes a spring.

5. The valve of claim 4, wherein said spring comprises a wave spring.

6. The valve of claim 4, wherein said cushioning means includes retaining means fixed to the valve member for retaining said cushioning means in place.

7. In a valve having a valve member movable between open and closed conditions and an actuating member having an end directly coupled to the valve member by a coupling pin for operating the valve member, wherein the pin has an axis extending between opposite ends thereof and the actuating member is connected to the pin intermediate its ends, so that operation of the valve member applies forces to the pin in a direction perpendicular to the axis, the improvement comprising: support means mountable on the valve member and engageable with the pin adjacent to its opposite ends for supporting the pin, said support means including resilient cushioning means being yieldable to accommodate translational movement of the pin in response to the forces exerted thereon by the actuating member, and mounting means removably mounting aid support means as a unit on the valve member.

8. The valve of claim 7, wherein said mounting means includes an annular support plate fixed to the valve member.

9. The valve of claim 8, wherein said annular support plate receives one end of the actuating member therethrough.

10. The valve of claim 8, and further comprising threaded fastening means for releasably mounting said annular support member on the valve member.

11. The valve of claim 8, wherein said cushioning means comprises a wave spring.

12. The valve of claim 7, wherein said cushioning means comprises an annular spring.

13. In a valve having a valve member movable between open and closed conditions and an actuating member having an end directly coupled to the valve member by a coupling pin for operating the valve member, wherein the pin has an axis extending between opposite ends thereof and the actuating member is connected to the pin intermediate its ends, so that operation of the valve member applies forces to the pin in a direction perpendicular to the axis, the improvement comprising: a first support member fixed to the valve member, a second support member disposed in engagement with the pin adjacent to its opposite ends and movable relative to the valve member and to said first support member, and resilient means disposed between said first and second support members and urging them apart, said resilient means accommodating movement of said second support member toward said first support member thereby to accommodate translational movement of the pin in response to the forces exerted thereon by the actuating member.

14. The valve of claim 13, wherein said first support member comprises an annular ring receiving one end of the actuating member therethrough.

15. The valve of claim 14, and further comprising screws releasably securing said first support member to the valve member.

16. The valve of claim 14, wherein said second support member is an annular member coaxial with said first support member.

17. The valve of claim 16, wherein said resilient means comprises an annular spring.

18. The valve of claim 17, wherein said spring is a wave spring.

19. The valve of claim 13, and further comprising stop means for limiting the movement of said second support member away from said first support member.

20. The valve of claim 19, wherein said stop means comprises a ring fixed to said first support member for cooperation therewith to retain said second support member and to sandwich said resilient means between said first and second support members in an integral cartridge module which can be fixed as a unit to the valve member.

* * * * *

UNITED STATES PATENT AND TRADEMARK OFFICE
CERTIFICATE OF CORRECTION

PATENT NO.   : 5,342,026
DATED        : August 30, 1994
INVENTOR(S)  : Robert H. Dean It is certified that error appears in the above-indentified patent and that said Letters Patent is hereby corrected as shown below:

Column 5, line 27, "aid" should be --said--.

Signed and Sealed this

Twenty-second Day of November, 1994

Attest:

BRUCE LEHMAN

Attesting Officer

Commissioner of Patents and Trademarks